No. 645,652. Patented Mar. 20, 1900.
O. E. WEBBER.
CLOTH MEASURING DEVICE.
(Application filed Aug. 11, 1897.)
(No Model.) 3 Sheets—Sheet 1.
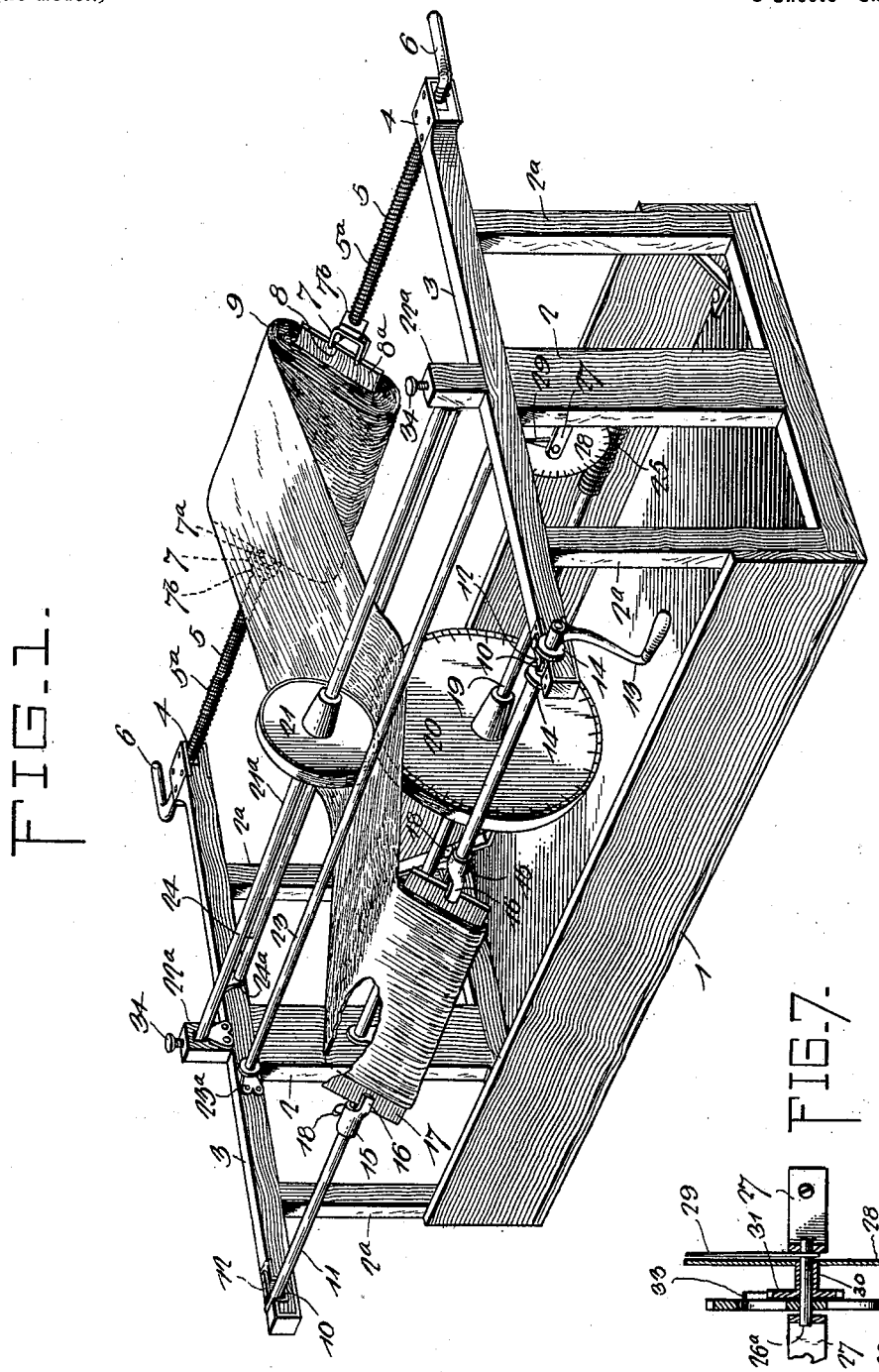
Witnesses
J. Frank Culverwell.
J. F. Riley
Oliver E. Webber, Inventor.
By his Attorneys,
C. A. Snow & Co.
THE NORRIS PETERS CO., PHOTO-LITHO., WASHINGTON, D. C.

No. 645,652. Patented Mar. 20, 1900.
O. E. WEBBER.
CLOTH MEASURING DEVICE.
(Application filed Aug. 11, 1897.)
(No Model.) 3 Sheets—Sheet 2.
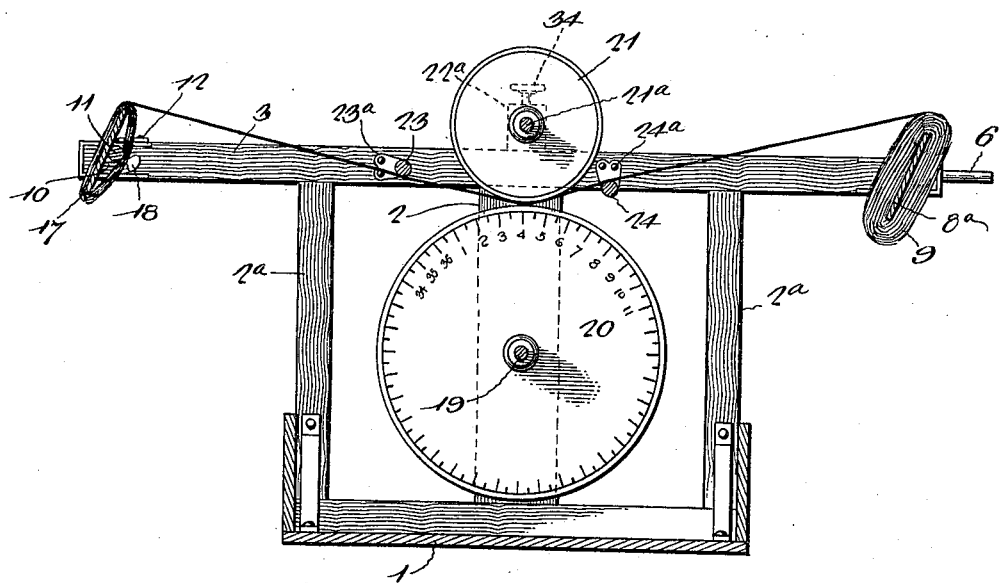
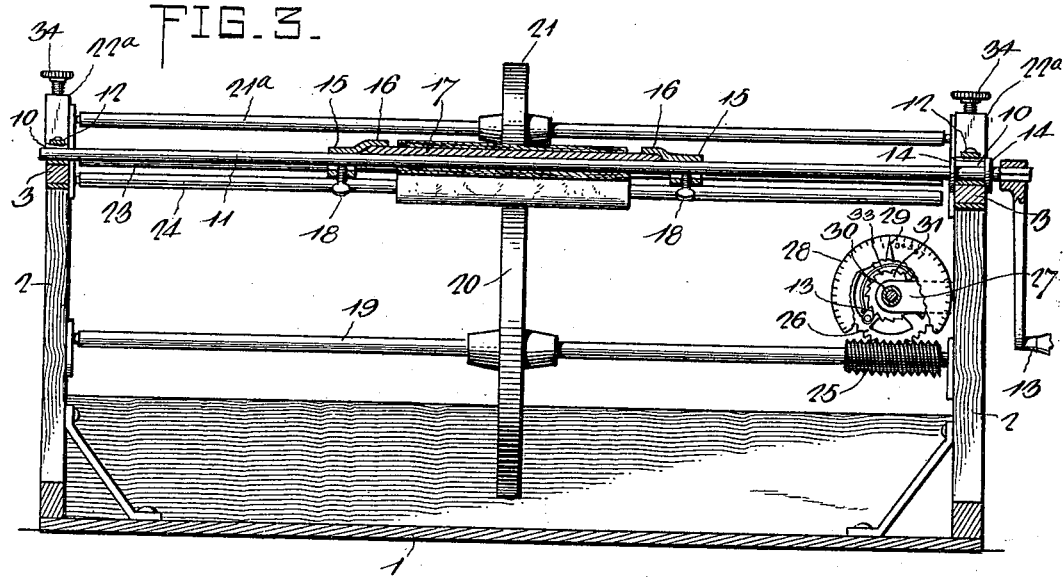
Witnesses Oliver E. Webber, Inventor.
By his Attorneys,
C A Snow & Co.

No. 645,652. Patented Mar. 20, 1900.
O. E. WEBBER.
CLOTH MEASURING DEVICE.
(Application filed Aug. 11, 1897.)

(No Model.) 3 Sheets—Sheet 3.

Witnesses
W. E. Allen
Victor J. Evans

Inventor
Oliver E. Webber
By John Wedderburn
Attorney

UNITED STATES PATENT OFFICE.

OLIVER E. WEBBER, OF MANNING, SOUTH CAROLINA.

CLOTH-MEASURING DEVICE.

SPECIFICATION forming part of Letters Patent No. 645,652, dated March 20, 1900.

Application filed August 11, 1897. Serial No. 647,798. (No model.)

*To all whom it may concern:*

Be it known that I, OLIVER E. WEBBER, a citizen of the United States of America, residing at Manning, in the county of Clarendon and State of South Carolina, have invented certain new and useful Improvements in Measuring Devices; and I do hereby declare the following to be a full, clear, and exact description of the invention, such as will enable others skilled in the art to which it appertains to make and use the same.

The invention relates to improvements in cloth-measuring machines.

One object of the present invention is to improve the construction of cloth-measuring machines and to provide a simple, inexpensive, and efficient one designed especially for measuring off rapidly and accurately the number of linear yards in bolts of cloth, dry goods, and other fabrics, including tapes, ribbons, and the like.

A further object of the invention is to provide a machine of this character adapted for measuring the contents of broken bolts or pieces of cloth, whereby a merchant may ascertain in the shortest possible space of time the exact number of yards and inches in such broken bolt.

The invention consists in the construction and novel combination and arrangement of parts hereinafter fully described, illustrated in the accompanying drawings, and pointed out in the claims hereto appended.

Figure 4:
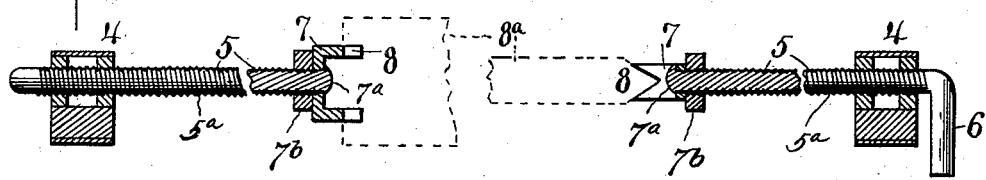
Figure 5:
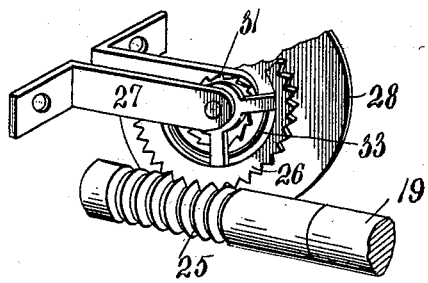
Figure 6:
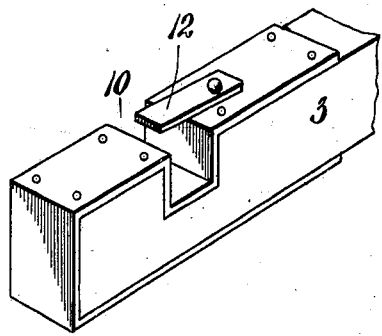

In the drawings, Figure 1 is a perspective view of a measuring-machine constructed in accordance with this invention. Fig. 2 is a central longitudinal sectional view. Fig. 3 is a transverse sectional view taken in line with the operating-shaft. Fig. 4 is a detail sectional view illustrating the construction for clamping a bolt preparatory to measuring the contents thereof. Fig. 5 is a detail perspective view of the registering mechanism. Fig. 6 is a detail perspective view of one of the bearings for the operating-shaft. Fig. 7 is a central sectional view of the indicating mechanism.

Like numerals of reference designate corresponding parts in all the figures of the drawings.

1 designates the base of the supporting-frame, which is provided with centrally-arranged uprights 2, located at opposite sides of the machine and supporting horizontal longitudinal bars 3, which are also supported by corner-posts 2ª, and the said longitudinal bars may be varied in length to provide a machine to suit the character of the material to be measured. The bars 3 are provided at one end with bearings 4, in which is threaded a pair of short transverse centering-shafts 5, provided at their outer ends with suitable cranks or handles 6, by means of which they may be rotated for adjusting them. The inner end of each of the short shafts 5 is provided with a substantially U-shaped clamping-head 7, having at their engaging ends or portions V-shaped notches 8, whereby they are adapted to receive and engage the ends of a board 8ª, upon which the bolt 9 of cloth or other material is wrapped or wound. The heads 7 are provided at their transverse portions with openings, through which pass the inner ends of the short shafts 5, and the latter have their inner journals enlarged to form heads or stops 7ª to retain the clamping-heads in place. These shafts, which are provided with screw-threads 5ª, receive nuts 7ᵇ, which form inner stops for the clamping-heads 7, and by this construction the latter are swiveled to the short longitudinal centering-shafts and are adapted to rotate independently thereof. The short shafts 5 are capable of longitudinal adjustment to enable the material to be centered in the machine and to permit a bolt of cloth to be readily placed therein, and after the operation of measuring a piece of cloth or other fabric has been completed either of the short shafts may be drawn outward by unscrewing it to release the board upon which the material is wrapped before it was measured.

The longitudinal bars 3 are provided at their opposite ends with bearings 10 for a transverse shaft 11, which is rotated by hand to operate the machine. The bearings 10 are open at their tops to permit of the ready removal of the shaft 11, which is normally retained in place and held against accidental displacement by turn-buttons 12, pivoted to the bars 3 at the inner sides of the bearings and adapted to project over the same, as clearly illustrated in Fig. 6 of the accompanying drawings.

One end of the shaft 11 is provided with a crank-handle 13, by means of which it may be rotated, and adjacent to the crank-handle is arranged a pair of shoulders or flanges 14, spaced apart to receive the adjacent longitudinal bar 3, whereby the shaft is held against longitudinal movement in the bearings 12. Mounted upon said operating-shaft 11 at points between the ends thereof is a pair of clamps, each consisting of a sleeve or collar 15 and an arm or finger 16, adapted to engage a board 17, upon which the material is to be wound. The clamps are capable of longitudinal adjustment to accommodate boards of any length within the limits of the machine, and they are secured in such adjustment by clamping-screws 18, mounted on the sleeves 15 in threaded perforations thereof and engaging the shaft 11.

In operation the board 17 is engaged and held between the clamps at the central point on the shaft 11, and the free end of the cloth or other material is then wrapped around the said board 17, whereby when the shaft 11 is rotated the material will be wound upon the board 17 and unwound from the board $8^a$, upon which it was previously wrapped. The cloth or other material as it is carried from one end of the machine to the other passes over a measuring-disk 20, mounted on a lower transverse shaft 19, located at the center of the machine and journaled in suitable bearings, as clearly illustrated in Figs. 1 and 3 of the accompanying drawings. The periphery of the measuring-disk, which is preferably covered with rubber, leather, or other suitable material to afford the necessary frictional contact with the goods to insure an operation of the registering mechanism, has its circumference equal to one yard and graduated into inches and fractions thereof; but a measuring-disk of any other size may be employed, as will be readily apparent. The cloth or other fabric is maintained in contact with the periphery of the measuring disk or wheel 20 by an upper friction disk or wheel 21, located above the measuring disk or wheel and having its periphery covered with leather or other suitable material, as clearly illustrated in Fig. 2 of the accompanying drawings. The cloth or other material passes beneath the disk or wheel 21, and a positive rotation of the measuring disk or wheel is thereby obtained. The friction disk or wheel 21 is mounted upon an upper centrally-arranged transverse shaft $21^a$, disposed in vertical alinement with the lower transverse shaft 19 and journaled at its ends in suitable bearings or blocks $22^a$. The blocks $22^a$ are mounted upon the longitudinal bars 3 at points above the uprights 2 and are provided with suitable thumb-screws 34, located at the tops of the blocks and arranged to engage the ends of the shaft 22 to regulate the friction, whereby the resistance or frictional engagement of the wheel 21 may be increased or diminished or relieved altogether, as desired.

The cloth or other material is guided and supported by transverse rolls 23 and 24, located, respectively, in advance and in rear of the vertical plane of the shafts 19 and 22, the cloth or other material 9 passing under the roll 23 and over the roll 24, as clearly shown in Fig. 2. The rolls 23 and 24 are journaled in suitable bearings of plates $23^a$ and $24^a$, secured to the inner faces of the longitudinal bars. One end of the shaft 19 is threaded or provided with a worm 25, which meshes with the periphery of a gear-wheel 26, mounted upon a short transverse shaft $26^a$, journaled in arms of a bracket 27. The bracket 27 is composed of two L-shaped sections or plates secured to the inner face of the adjacent upright 2 and extending horizontally therefrom. Mounted upon the shaft $26^a$ is a dial 28, graduated at or near its periphery, and such graduations are adapted to register with a stationary pointer or indicator 29, rigidly mounted on one of the arms of the bracket 27 and extending upward therefrom. The gear-wheel 26 and the dial 28 are capable of independent rotation, the latter being preferably mounted upon the sleeve 30, which carries a ratchet-disk 31, adapted to be engaged by a pawl 13, pivotally mounted on the gear-wheel 26 and held in engagement with the ratchet-teeth by means of a spring 33. This construction permits the graduated disk to be rotated independently of the gear-wheel in order to return the same to the initial or starting point when one piece of goods has been measured and it is desired to arrange the machine for measuring another. The graduated dial will indicate the number of revolutions of the measuring-disk and the peripheral graduations of the latter will indicate inches and fractions thereof.

It will be seen that the measuring-machine is simple and comparatively inexpensive in construction, that it is positive, reliable, and accurate in its operation, and that it is capable of indicating at a glance the exact contents of a piece of goods in yards and inches.

Changes in the form, proportion, size, and the minor details of construction within the scope of the appended claims may be resorted to without departing from the spirit or sacrificing any of the advantages of this invention.

What is claimed is—

1. A machine of the class described comprising a frame, a lower measuring-wheel located at the center of the frame, an upper friction-wheel, a pair of transverse shafts supporting the said wheels and journaled in suitable bearings of the frame, the transverse guide-rollers located in advance and in rear of the said wheels and arranged to engage the fabric at the lower and upper faces thereof, short transverse shafts arranged at one end of the machine and adapted to receive the bolt to be measured, an operating-shaft detachably mounted at the other end of the frame and arranged to receive the material as it is measured, a bracket arranged at one side of the machine and composed of two L-shaped members, a transverse shaft mounted on the outwardly-extending arms of the L-shaped members, a worm carried by the shaft upon which the measuring-wheel is mounted, a gear-wheel mounted on the short transverse shaft, adjacent to one of the members of the bracket and meshing with the said worm, a sleeve also mounted on the short shaft and interposed between the members of the bracket, a ratchet-wheel mounted on the sleeve at the rear end thereof, a graduated disk frictionally engaging the sleeve at the front end thereof, carried by the same and adapted to be rotated independently thereof by hand, a spring-actuated pawl mounted on the gear-wheel and engaging the ratchet-wheel, and a fixed pointer located adjacent to the front end of the short shaft, substantially as and for the purpose described.

2. In a machine of the class described, the combination of a transverse shaft provided at one end with a worm, a measuring-wheel mounted on the shaft, a bracket composed of a pair of L-shaped members, a short shaft secured to the outwardly-extending arms of the L-shaped members, a sleeve mounted on the short shaft, a gear-wheel also mounted on the short shaft and interposed between the rear end of the sleeve and the adjacent L-shaped member and meshing with the worm, a ratchet-wheel carried by the sleeve and arranged at the rear end thereof, a spring-actuated pawl pivoted to the gear-wheel and engaging the ratchet-wheel, a graduated disk frictionally engaging the front end of the sleeve and carried by the latter and adapted to be rotated independently thereof, by hand, and a fixed pointer supported by the shaft and interposed between the front member of the bracket and the graduated disk, substantially as described.

In testimony whereof I have signed this specification in the presence of two subscribing witnesses.

OLIVER E. WEBBER.

Witnesses:
P. B. MOUZUR,
A. J. WHITE, Jr.